United States Patent
Hasegawa

[11] Patent Number: 5,903,942
[45] Date of Patent: May 18, 1999

[54] SEAT BELT CUTTER AND METHOD FOR ATTACHING THE SAME

[75] Inventor: Kouei Hasegawa, Sanjo, Japan

[73] Assignee: Kabushiki-Kaisha Hasekou Seisakusho, Niigata-ken, Japan

[21] Appl. No.: 08/582,578

[22] Filed: Jan. 3, 1996

[30] Foreign Application Priority Data

Feb. 23, 1995 [JP] Japan .................................. 7-058193

[51] Int. Cl.⁶ .................................................. B25D 1/04
[52] U.S. Cl. ................................................ 7/144; 30/158
[58] Field of Search ........................... 7/143, 144, 151, 7/155; 30/158

[56] References Cited

U.S. PATENT DOCUMENTS

| | | | |
|---|---|---|---|
| 83,499 | 10/1868 | Holtzscheiter | 7/144 |
| 487,635 | 12/1892 | McGown | 7/144 |
| 822,066 | 5/1906 | Morkert | 7/144 |
| 980,786 | 1/1911 | Humphries | 7/144 |
| 981,786 | 1/1911 | Montgomery | 7/144 |
| 3,790,976 | 2/1974 | Stencil | 7/144 |
| 4,592,467 | 6/1986 | Lechner | 7/144 |
| 4,985,954 | 1/1991 | Wehr | 7/144 |
| 4,985,998 | 1/1991 | Howard | 30/155 |
| 5,085,449 | 2/1992 | Hudson . | |
| 5,630,242 | 5/1997 | Oginaezawa | 7/144 |

FOREIGN PATENT DOCUMENTS

| | | |
|---|---|---|
| 531679 | 3/1993 | European Pat. Off. . |
| 1922162 | 11/1969 | Germany . |
| 54-141573 | 10/1979 | Japan . |
| 57-39860 | 3/1982 | Japan . |
| 64-2657 | 1/1989 | Japan . |
| 64-9077 | 1/1989 | Japan . |
| 5-58519 | 1/1992 | Japan . |
| 4-28506 | 5/1992 | Japan . |

OTHER PUBLICATIONS

Abstract of GM 82 03 739, GMA–Heft 27 vom 8,7,1982, 1071, Klasse B26 with English translation.

*Primary Examiner*—David A. Scherbel
*Assistant Examiner*—Joni B. Danganan
*Attorney, Agent, or Firm*—Birch, Stewart, Kolasch & Birch, LLP

[57] ABSTRACT

A seat belt cutter for automotive vehicles includes a blade and a hammer which are provided on a grip member. The blade member has an arcuate end portion and a serrated edge portion and is pivotally mounted to the grip member. The hammer can include a pair of sharply pointed head portions or a single hammer member and this hammer is provided at an end of the grip member.

2 Claims, 8 Drawing Sheets

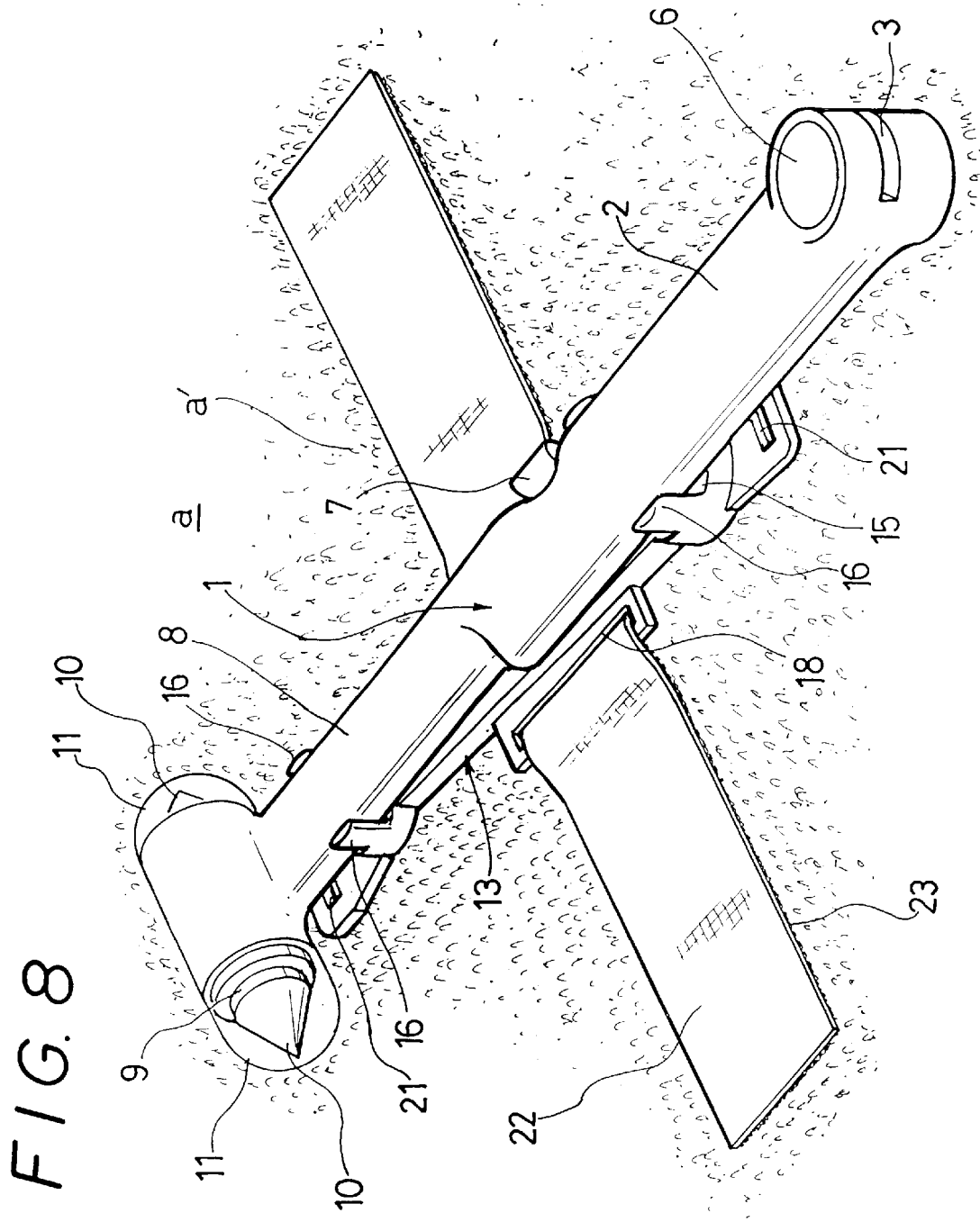

SEAT BELT CUTTER AND METHOD FOR ATTACHING THE SAME

FIELD OF THE INVENTION

This invention relates to a seat belt cutter for automotive vehicles and a method for attaching the cutter device to a driver's seat.

BACKGROUND OF THE INVENTION

When a vehicle collision has occurred, a seat belt is rapidly locked due to shock of the collision. This makes a driver sitting on a driver s seat and a passenger sitting on an assistant driver's seat with a seat belt around their bodies unable to move. As a consequence, the driver and the passenger sitting next to the driver are unable to escape from the vehicle.

In order to cope with such a critical situation as mentioned above, a seat belt cutter or scissors are, in some cases, kept nearby the driver's seat. However, since a blade portion of such a cutter is usually exposed outside, there is a risk that the user accidentally cuts the finger during the handling of the cutter. Moreover, since no exclusive-use scissors are available, the seat belt cannot be rapidly and completely cut by one action. Thus, those conventional cutter and scissors greatly lack practicality.

It is therefore a first object of the present invention to provide an emergency seat belt cutter in which the above-mentioned inconveniences are fully obviated, handling is not dangerous and cutting operation can rapidly be made in an emergency.

Heretofore, no special consideration is given at all, on the side of a provider of a seat belt cutter, to an idea that the seat belt cutter should be- kept in a suitable place nearby the driver's seat as seat belt attaching means. Accordingly, there was no other way for the driver but to select a desired place for keeping the seat belt cutter.

It is therefore a second object of the present invention to provide a method for attaching a seat belt cutter in which a seat belt cutter is fixedly kept in a most convenient place nearby the driver's seat by reasonable means capable of obviating the above-mentioned inconveniences.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

BRIEF DESCRIPTION OF THE DRAWINGS

FIG. 8 is a perspective view of an overall mounting device after the attachment.

DETAILED DESCRIPTION OF THE PREFERRED EMBODIMENTS

Figure 1:
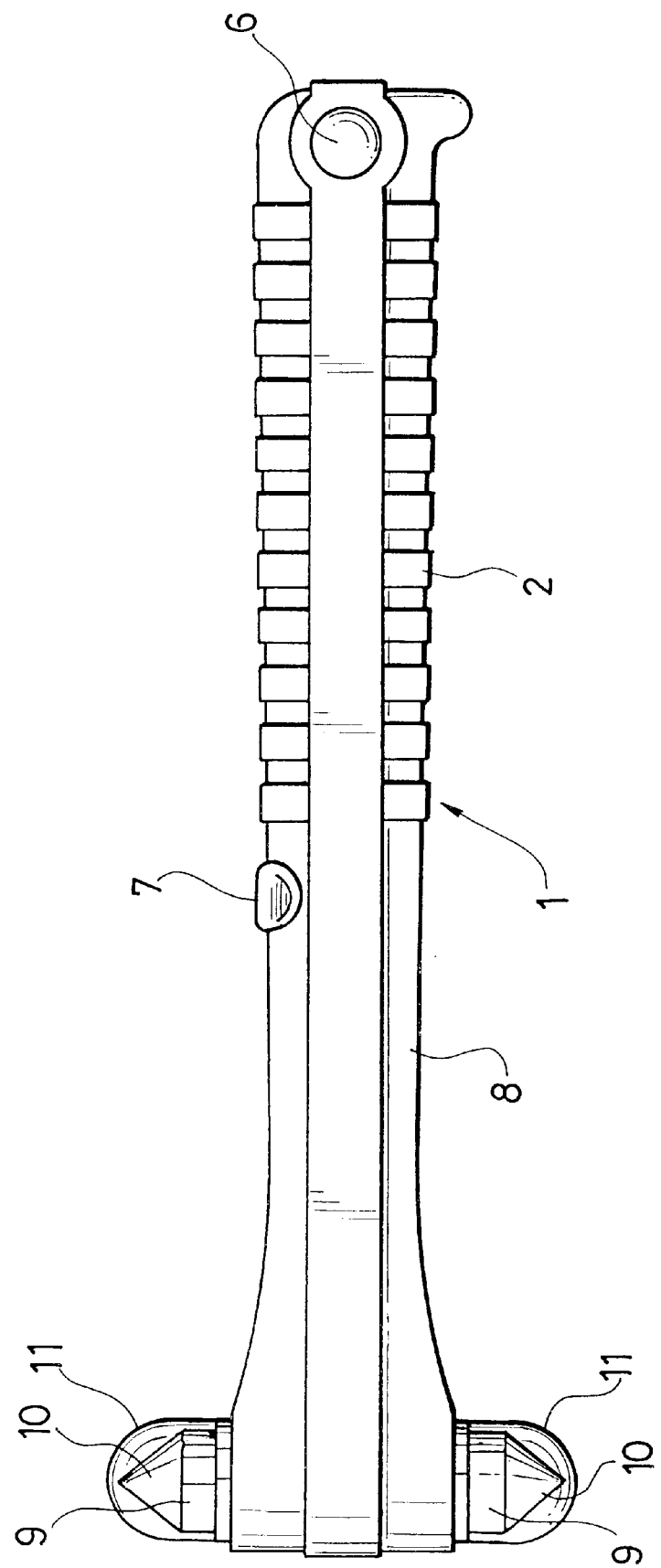
FIG. 1 is a front view of an overall seat belt cutter.
Figure 2:
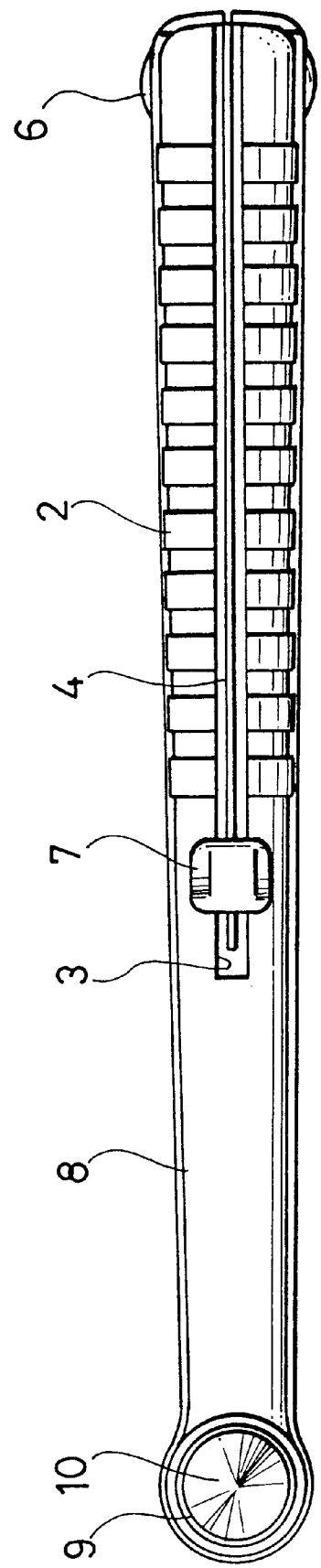
FIG. 2 is a plan view of an overall seat belt cutter.
Figure 3:
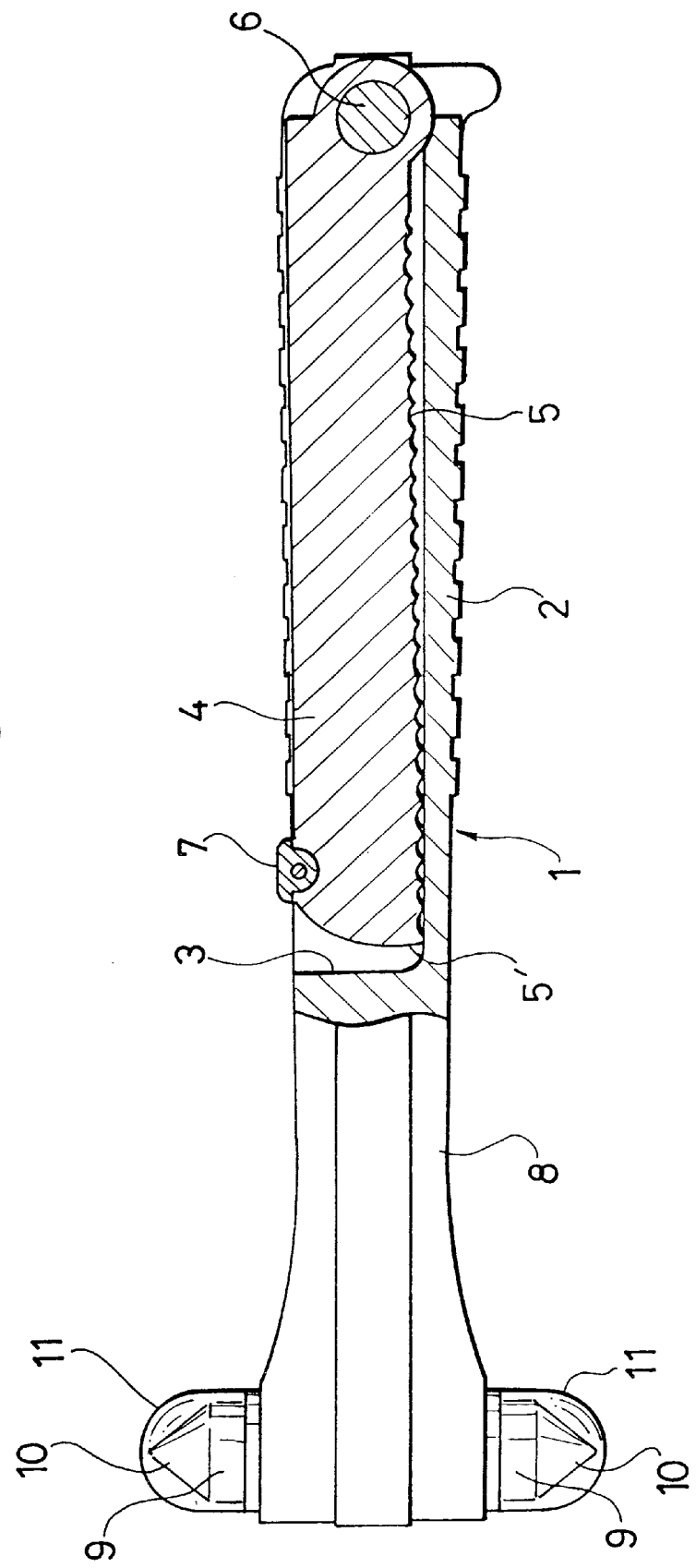
FIG. 3 is a front view, partly cut-away, of an overall seat belt cutter.
Figure 4:
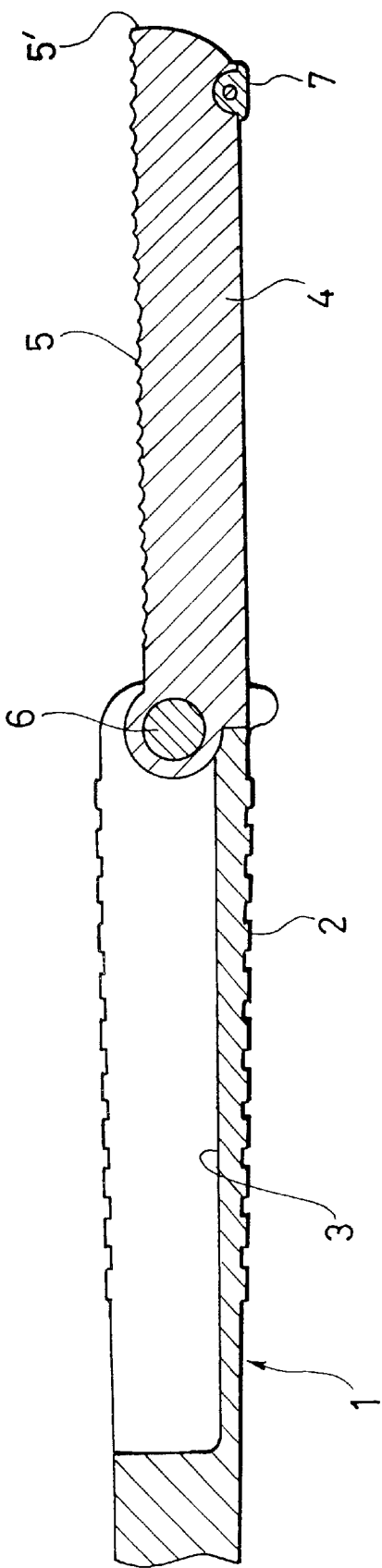
FIG. 4 is a front sectional view of an important portion when in use.

One preferred construction and operation of the present invention will now be described in detail with reference to the accompanying drawings.

Reference numeral 1 denotes a grip member. A concave groove 3 having a suitable length and depth is formed in one side portion 2 of the grip member 1.

Reference numeral 4 denotes a blade member. The blade member 4 is received in the concave groove portion 3 with its basal end portion pivotally attached to one end portion of the concave groove portion 3, so that the blade member 4 can be opened and closed relative to the concave groove 3. The blade member 4 has a serrated edge portion 5. A distal end portion 5' of the blade member 4 is arcuate.

Reference numeral 7 denotes a handle (or knob) disposed on one end of the back of the blade member 4. The blade member 4 can be pulled out from the concave groove 3 through the handle 7.

Reference numerals 9, 9 denote a pair of hammer members. The hammer members 9, 9 respectively have sharply pointed head portions 10, 10 disposed on left and right sides of one end portion of the other side portion 8 of the grip member 1. Transparent caps 11, 11 are fitted to the sharply pointed head portions, respectively.

Figure 5:
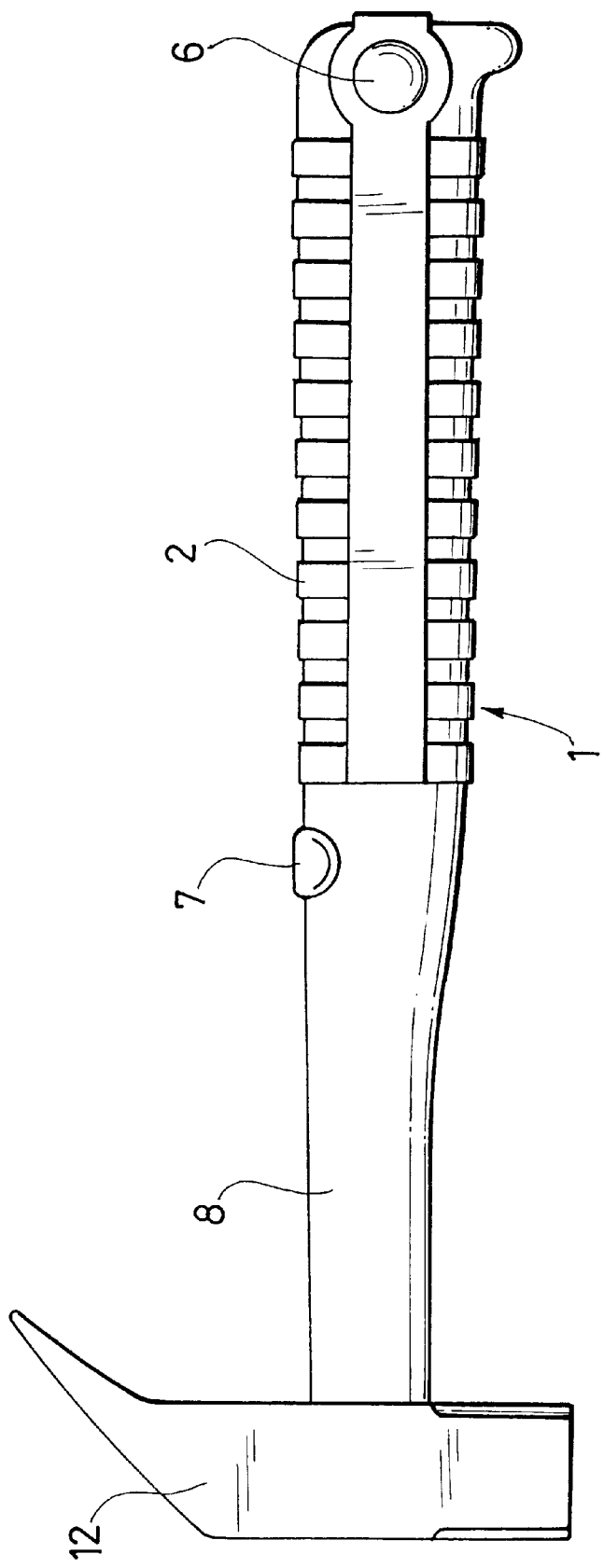
FIG. 5 is a front view of an overall seat belt cutter according to another embodiment.

FIG. 5 shows another embodiment of the present invention. Instead of the pair of hammer members 9, 9 having sharply pointed head portions of the preceding embodiment, a single hammer member 12 is provided on the other end portion of the grip member 1.

Figure 6:
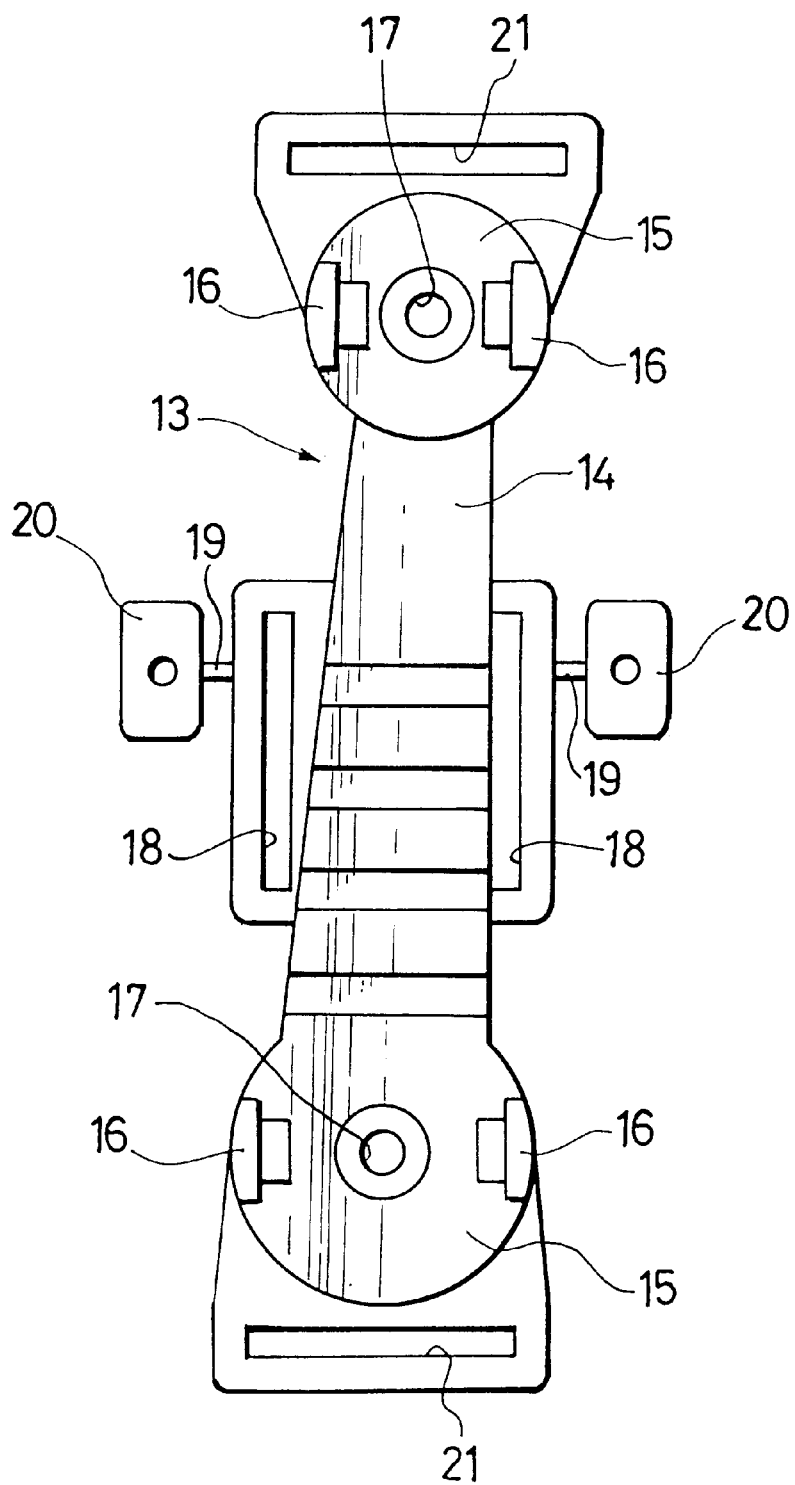
FIG. 6 is a plan view of an overall mounting device.
Figure 7:
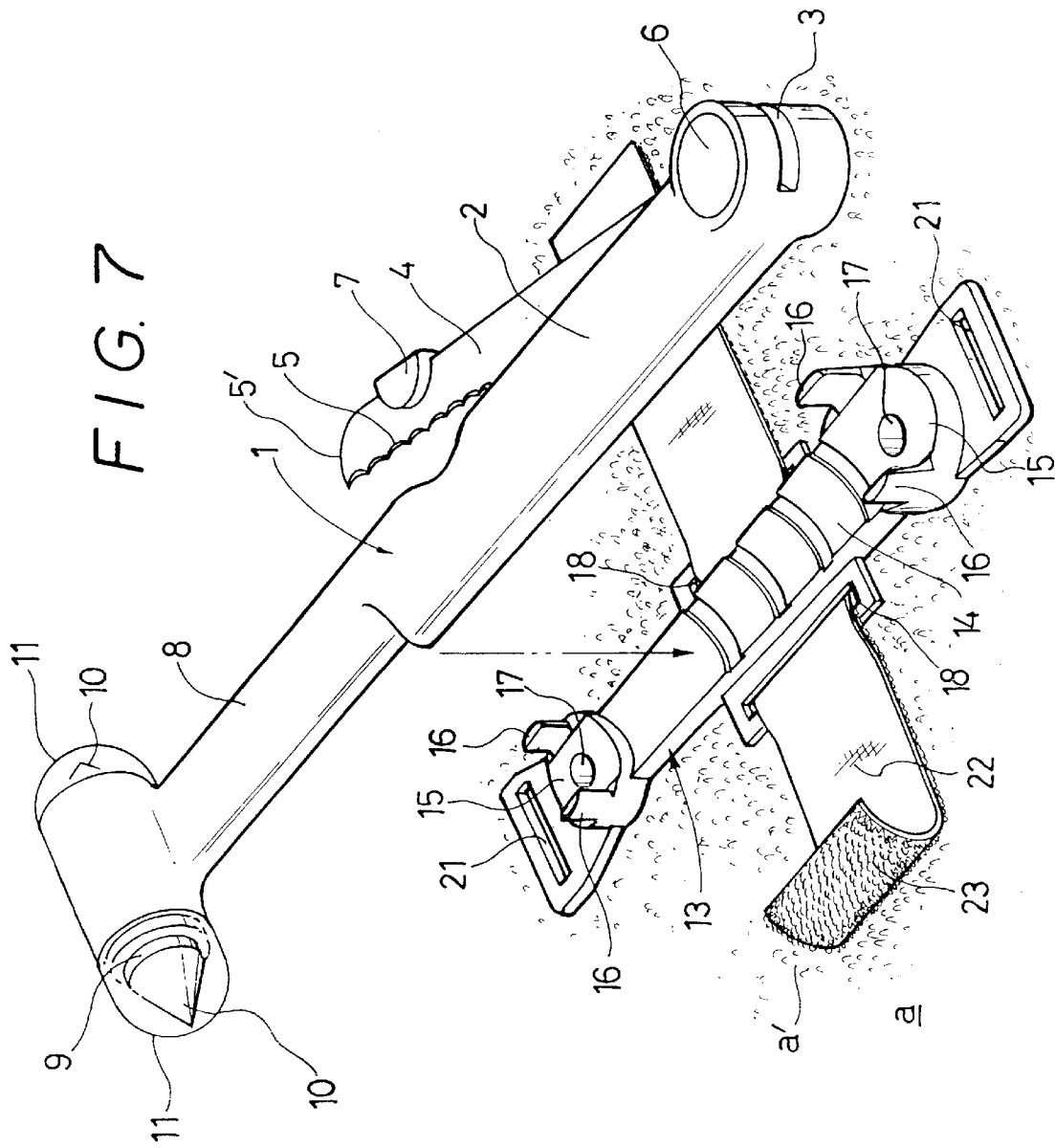
FIG. 7 is a perspective view of an overall mounting device before the attachment.

In FIG. 6, reference numeral 13 denotes a mounting device for retaining the seat belt cutter when the seat belt cutter is not in use. This mounting device comprises a base member 14 having a predetermined length, and two restraining members 15, 15 one of which is disposed on a front end of the base member 14 and the other of which is disposed on a rear end thereof. An inner side of the base member 14 terminates in a concave arcuate surface. The restraining members 16 are respectively provided with restraining pieces 16, 16 formed on and erected from left and right side portions thereof. The grip member 1 is placed on the base member 14 and the restraining members 15, 15 of the mounting device 13, so that grip member 1 is restrained from both the left and right sides.

Throughholes 17, 17 are formed in the centers of the restraining members 15, 15, respectively. Screws are threaded into the throughholes 17, 17, respectively. Throughhole members 20, 20 as later described are respectively attached to distal end portions of the screws through pads as later described.

Reference numerals 18, 18 denote insert hole portions provided on left and right side portions of the base member 14 of the mounting device 13. A tape 22 as later described is inserted between the insert holes 18, 18 and extends leftwardly and rightwardly. Throughholes 20, 20 are provided in outward locations of the insert hole portions 18, 18 through breakage elements 19, 19, respectively.

Reference numerals 21, 21 respectively denote insert hole portions provided on front and rear side portions of the restraining members 15, 15. A tape 22 as later described is inserted between the insert holes and allowed to extend forwardly and backwardly.

Reference numeral 22 denotes a tape have a large number of hook-like projections 23 formed on one side thereof. This tape with said one side facing down is inserted between the insert holes 18, 18 in a leftward and rightward direction and between the insert holes 21, 21 in a forward and backward direction.

Reference character a denotes a pad made of cloth. The pad a is laid on an area in the vicinity of the foot portion of the driver's seat, with a surface a' having a loop-like projections facing upward. This kind of a cloth pad is usually provided on any automobile. When the driver adheres the tape 22, which has been attached to the mounting device 13 in the left and right direction or front and rear direction, or both directions, to a suitable place of the pad a, the hook surface of the tape side is fixedly attached to the loop surface of the pad side. In this case, since the throughhole members 20, 20 are not required, the breakages 19, 19 can be omitted.

However, the cloth pad a is not usually used in a truck. Since it is a pad made of vinyl or synthetic rubber that is usually used in a truck, the tape 22 of the above-mentioned type cannot be used because the tape cannot be fixedly attached to the pad made of vinyl or synthetic resin. In such a case, therefore, separately prepared screws are threaded into the throughholes 17, 17 of the restraining members 15, 15. The screws are further passed through throughholes formed in the pad so as to be engaged with the throughhole members 20, 20 as washers. By doing this, the mounting device 13 of the seat belt cutter is attached to the pad. It should be noted that this arrangement is not shown.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A seat belt cutter comprising:

a grip member, the grip member having a concave groove with a suitable length and depth on one side portion thereof, the grip member having a generally uniform, constant diameter;

a blade member having an arcuate distal end portion and serrated edge portion, the blade member being placed in said concave groove with a basal end portion of the blade member being pivotally attached to one end portion of the concave groove such that the blade member is openable and closeable relative to the concave groove, the blade member having a back on an edge opposite the serrated edge portion, the blade member generally having a uniform thickness;

a handle provided on a part of the back of the blade member, the handle having a width which is greater than a width of the blade member and less than a minimum width of the grip member, the blade member generally having a uniform width and the handle being on each side of the blade member;

a pair of hammer members each having a sharply pointed head portion, the hammer members being provided on left and right end portions of the grip member at an end opposite the concave groove; and a transparent cap fitted to each hammer member having the sharply pointed head portion.

2. A seat belt cutter comprising:

a grip member, the grip member having a concave groove with a suitable length and depth on one side portion thereof, the grip member having a generally uniform constant diameter;

a blade member having an arcuate distal end portion and serrated edge portion, the blade member being placed in said concave groove with a basal end portion of the blade member being pivotally attached to one end portion of the concave groove such that the blade member is openable and closeable relative to the concave groove, the blade member having a back on an edge opposite the serrated edge portion, the blade member generally having a uniform thickness;

a handle provided on a part of the back of the blade member, the handle having a width greater than a width of the blade member and less than a minimum width of the grip member, the blade member generally having a uniform width and the handle being on each side of the blade member; and a hammer member an end portion of the grip member at an end opposite the concave groove.

* * * * *